(12) United States Patent
Miles, Jr. et al.

(10) Patent No.: US 6,181,261 B1
(45) Date of Patent: Jan. 30, 2001

(54) AIRFIELD HAZARD AUTOMATED DETECTION SYSTEM

(75) Inventors: James R. Miles, Jr., Alexandria, VA (US); Robert L. Monroe, Daleville, AL (US)

(73) Assignee: The United States of America as represented by the Secretary of the Army, Washington, DC (US)

(*) Notice: Under 35 U.S.C. 154(b), the term of this patent shall be extended for 0 days.

(21) Appl. No.: 09/339,291

(22) Filed: Jun. 24, 1999

(51) Int. Cl.[7] ............................. G01C 21/00; G01C 23/00
(52) U.S. Cl. .......................... 340/971; 340/933; 342/29; 342/36
(58) Field of Search ...................... 340/933, 945, 340/903, 435, 642; 244/114 R; 342/29, 32, 36, 37; 348/148, 149

(56) References Cited

U.S. PATENT DOCUMENTS

| | | | |
|---|---|---|---|
| 4,481,516 | * 11/1984 | Michelotti | 340/933 |
| 5,448,243 | * 9/1995 | Bethke et al. | 342/29 |
| 5,495,249 | * 2/1996 | Chazelle | 342/36 |
| 5,530,440 | * 6/1996 | Danzer et al. | 340/933 |
| 5,557,278 | * 9/1996 | Piccirillo et al. | 342/29 |
| 5,629,691 | * 5/1997 | Jain | 340/933 |
| 5,670,961 | * 9/1997 | Tomita et al. | 342/36 |
| 5,999,116 | * 12/1999 | Evers | 342/36 |

* cited by examiner

Primary Examiner—Daniel J. Wu
Assistant Examiner—John Tweel, Jr.
(74) Attorney, Agent, or Firm—Milton W. Lee; John E. Holford; Alain L. Bashore

(57) ABSTRACT

An airfield hazard automated detection device having a radar for scanning the airfield for obstacles and an automated target recognition system, operably connected to the radar, for comparing the images of the scans of the obstacles to images of known potential hazards and for instructing a directed imaging system to verify the potential hazard by scanning the potential hazard and indicating the result.

6 Claims, 2 Drawing Sheets

AIRFIELD HAZARD AUTOMATED DETECTION SYSTEM

THE FIELD OF THE INVENTION

The present invention is generally directed to a method and device for detecting hazards on and around airfields. More specifically, the method and device detect a hazard, verify the hazard and then output the results so that any potential damage to airfield operations may be averted.

BACKGROUND OF THE INVENTION

Each year the Federal Aviation Administration records many accidents that result in millions of dollars in damage to aircraft and uncounted costs to airfield operations. These accidents are often caused by wildlife that wandered onto the flight line, manmade objects forgotten on the flight line, or other objects blown onto the flight line.

Traditional methods of detecting these hazards have been time consuming and prone to large margins of error as both false positives and complete misses resulting in airfield hazards. Historically, even in sophisticated operations, an air traffic controller (ATC) would monitor a low resolution radar system. Based on the output from the system, the ATC would make a judgment whether the radar had detected a hazard. Often the hazards would be misinterpreted or altogether missed. The ATC would frequently also stop time sensitive flight line operations to manually verify that the flight line was clear of all airfield hazards.

There are at least two problems with this system. First, the radar is not a very precise instrument for detecting hazards. The radar typically has a very low resolution. Secondly, even if the radar does identify an airfield hazard, because of human error and interpretation it may not be verified and corrected.

As such, a need currently exists for an improved method and device for detecting hazards to airfield operations.

SUMMARY OF THE INVENTION

The present invention recognizes and addresses the foregoing disadvantages, and other prior art methods. Accordingly, it is an object of the present invention to provide an improved method for automated detection of hazards to airfield operations. It is another object of the invention to provide a device for an airfield hazard automated detection system which allows the operator to passively detect airfield operation hazards.

These and other objects of the present invention are achieved by providing a system for an airfield hazard automated detection system. The system includes a radar system and a directed verification system in operative communication with the radar system. The radar system scans an area and detects potential hazards to airfield operations. Upon detecting a hazard, it indicates that a potential hazard exists and communicates that to the directed infrared verification system that is in operative communication with the radar system. The directed verification system scans at least the indicated potential hazard and gives an output corresponding to the scan.

In another embodiment of the invention a multi-runway airfield hazard automated detection system includes a plurality of radar systems and a plurality of thermal imaging systems in operative communication with the radar systems. The radar systems scan an area to detect potential hazards to airfield operations. It compares a scan to radar signatures of known airfield hazards and then indicates whether the scan conformed to a known airfield hazard. Upon indication from at least one radar system, the thermal imaging system scans the airfield hazard and outputs a first result.

In yet another embodiment of the invention, a method for detecting airfield hazards is disclosed. The method includes scanning the airfield with a radar, comparing the results of the radar scan to known hazardous radar signatures, indicating the results to a directed verification system, verifying the results with the directed imaging system, signaling the results.

Additional objects and advantages of the invention are set forth in the detailed description herein, or will be apparent to those of ordinary skill in the art. Also it should be appreciated that modifications and variations to the specifically illustrated and discussed steps and devices may be practiced in various uses and embodiments of this invention without departing from the spirit and scope thereof, by virtue of present reference thereto. Such variations may include but are not limited to, substitution of equivalent steps or features for those shown or discussed, the reversal of various steps, and the grouping of separate components into one component, or the like.

Other objects, features and aspects of the present invention are discussed in greater detail below.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

Figure 1:
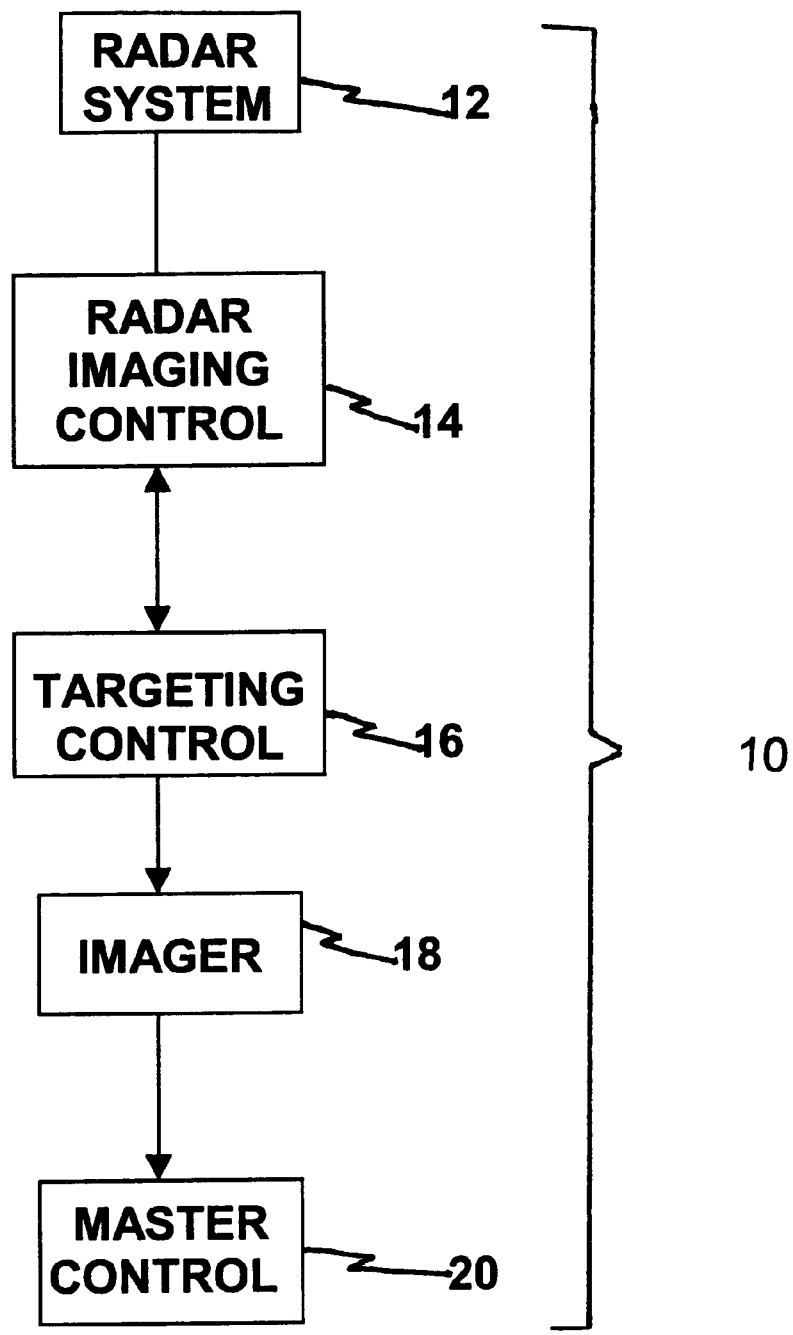
FIG. 1 is a wire diagram showing the components of an embodiment of the invention.

Repeat use of reference characters in the present specification and drawings is intended to represent same or analogous features of elements of the invention.

DETAILED DESCRIPTION OF THE PREFERRED EMBODIMENTS

It is to be understood by one of ordinary skill in the art that the present discussion is a description of exemplary embodiments only and is not intended as limiting the broader aspects of the present invention. The broader aspects are embodied in the exemplary construction.

In general, the present invention is directed to a device for airfield hazard detection. Referring now to FIG. 1, which shows a component diagram of the airfield hazard automated detection system 10, the diagram shows a radar system 12, a radar imaging control system 14, a targeting control system 16, a directed imaging device 18, and a master control system 20.

The radar system 12 is preferably at least one conventional airfield radar which is often already in use at the airfields. If there is no preexisting radar system at the airfield to be protected, at least one relatively inexpensive marine radar may also be used. Regardless of the type of radar used, the radar system should cover the entire area surrounding the airfield that one desires to monitor.

The positioning of the radar system around the airfield is a function of the coverage provided by the individual radars. The greater the coverage area of each radar, results in fewer radars being needed. The radars should be placed so as to cover the desired airfield area with any overlap being preferably at critical areas or areas exhibiting the highest incident rate of potential hazards.

In order to determine potential airfield hazards, the radar system should preferably operate so as to scan the entire airfield. As the radar system scans the airfield, it should indicate obstacles within the scan. The radar system may either discreetly or continuously indicate the obstacles to at least one radar imaging control system 14 to which the radar system is operatively connected.

The radar imaging control system 14 is preferably a personal computer. When the radar system 12 scans an area and indicates the result to the radar imaging control system 14, the radar imaging control system compares the radar system scan indicating all obstacles to stored values for potential airfield hazard. By comparing the obstacles indicated by the radar system to the known potential hazard, the radar imaging control system identifies when a potential airfield hazard is in the vicinity of the airfield. When a potential airfield hazard is shown to be in the scans, the radar imaging control system indicates to a targeting control system 16 the position of the potential hazard. In cases where the radar system scans areas outside a desired area, the radar imaging control may be programmed to ignore any potential hazards discovered in that area.

The targeting control system 16 is in operative communication with both the radar imaging control system 14 and the directed imaging device 18. The target control system receives the indication of a potential hazard from the radar imaging control device and directs the directed imaging device to look at the area in which the potential hazard was located. Preferably the targeting control system will be a personal computer. It may be the same personal computer used for the radar imaging control system. The targeting control system may also be a separate control system altogether as long as it indicates the targets to the directed imaging device.

The targeting control system is preferably also capable of predicting and projecting movement so that the directed imaging device may look ahead and aimed at the appropriate area to scan a potential hazard. The targeting control system preferably can calculate the speed and direction, if any, at which the potential hazard is moving, and predict the future position of the potential hazard based on the time in which it would take to redirect the directed imaging device to the projected potential hazard vector path. As the radar system repeatedly sweeps the obstacle, the radar imaging control system preferably updates its assessment of the obstacle as a potential hazard and the targeting control system recalculates and redirects the directed imaging system so that the thermal imaging system can scan and preferably track the potential hazard onto and/or off of the airfield.

The directed imaging device which is controlled by the targeting control system is preferably off the shelf but may be any imaging device capable of scanning potential hazards to determine whether the potential hazard is a verified hazard. For example, a television camera is an inexpensive and appropriate solution whenever the lighting conditions would allow such a usage. Additionally, an infrared camera, a low light (starlight) scope or camera, or preferably, a thermal imaging device may also be used.

The thermal imaging device is necessary because of the limitations of the radar system and the radar imaging control system. Both the radar system and the radar imaging control system typically do not provide the resolution necessary for a high degree of confidence verification. Typically, by relying on only the radar system and the radar imaging control system, the number of false positives and missed hazards were too high, thus exposing the airfield to an unacceptable number of missed hazards and to the slowing down of airfield operations by manually clearing the false positives.

The directed imaging device 18 signals the results of its directed scan. The results are either viewed by an operator or they can be analyzed by a master control system 20. The master control system is analogous to the radar imaging control system. The master control system is operatively connected to the directed imaging device and receives signals for the potential airfield hazards. Preferably, the master control system compares the potential airfield hazards to known airfield hazards and outputs the verified results. The operator reviews the results and can take actions to obviate the airfield hazard. The master control system can be a computer and is preferably the same personal computer that is used for the radar imaging control system.

The radar imaging control system and the master control system may preferably be replaced with the automated target recognition system already being utilized by the Department of Defense. The automated target recognition system should be reprogrammed to recognize airfield hazards instead of battlefield targets.

Another embodiment of the invention is a method of detecting airfield hazards. The method includes the steps of scanning an airfield for hazards with a radar. As the scanning is completed, the results are interpreted preferably with a computer or an automated target recognition system which determines if a potential hazard exists. If a potential hazard exists, the method requires that the potential hazard be verified with a directed verification system. The directed verification system has at least two steps before confirming that the potential hazard is an airfield hazard. The first step is targeting and scanning the potential hazard with a directed imaging system and outputting the results. The second step is verifying the results. This step can be done by either a computer or a human operator or preferably, both.

For example, if an airfield has an automated method of detecting airfield hazards, a radar scans the area for obstacles. The results of the scan are output to a radar imaging control device which interprets the results of the scan by comparing the scan to a stored scan with no obstacles. The results are output to a verification system where a directed imaging device is positioned so as to scan the potential hazard at a higher resolution. As the potential hazard is scanned, the results are verified by either the operator who views the directed imaging scan, or by a computer which compares the directed imaging scan to stored scans of airfield hazards. After making the comparison, the results are signaled to the operator in a variety of forms including an alarm, visual verification, and automatic airfield hazard clearing procedures. The automatic airfield hazard clearing procedures may include a wildlife deterrence system. The wildlife deterrence system may be anything that will cause the wildlife to be deterred from remaining as an airfield hazard including ultrasound, bright lights, alarms and klaxons, and loud reports.

In another embodiment of the invention, the airfield hazard automated detection system can be constructed for multiple runway systems. The components of the multiple runway system are the same as the single runway system. The most significant difference is the way the components are arrayed.

Figure 2:
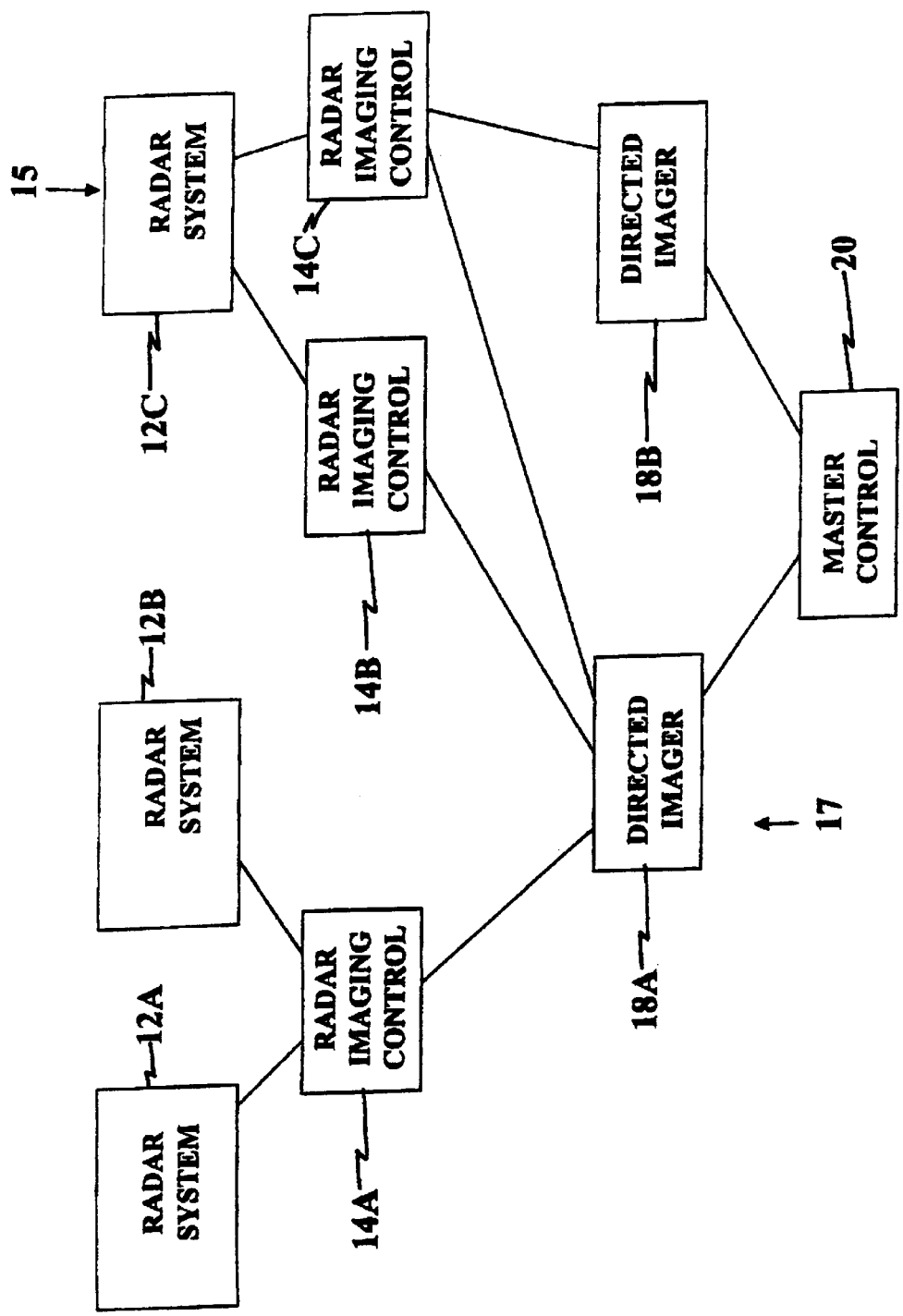
FIG. 2 is a wire diagram showing the components of a multi-airstrip embodiment of the invention.

As in FIG. 2, the multiple runway system may have several radar systems, shown as 12A, 12B and 12C, which may be connected to the same radar imaging control system 14 so that the radar systems could get a better view of the obstacles from different vantage points. By creating different vantage points, the radar imaging control system would be more accurate in determining potential hazards. Conversely, a single radar may be attached to multiple radar imaging control systems 15. One potential advantage of this is that two or more radar imaging control systems could divide the scans of obstacles to process the scans quicker and at a higher level of accuracy. The radar imaging control systems may be arrayed to handle obstacles as they are presented with radar imaging control system 1 taking the first obstacle and radar imaging control system 2 taking the second obstacle and so on. Alternatively each radar imaging control system may be assigned to only handle obstacles in a certain location or of a certain signal strength as indicated by the radar.

Similarly, multiple directed imaging systems 18A, 18B and 18C may be connected to each radar imaging control system, as in 14A, as well as one multiple directed imaging system may be connected to multiple radar imaging control systems. The directed imaging system, 18A, in one embodiment, is connected to several radar imaging control systems, 14A, 14B and 14C. In another embodiment several directed imaging systems 18A and 18B are connected to one master control 20. The configuration for each airfield depends on at least the area to be scanned, the type of equipment used, the degree of certainty required, and the number of obstacles that need to be verified as hazards.

It should be further understood by those of ordinary skill in the art that the foregoing presently preferred embodiments are exemplary only and that the attendant description thereof is likewise by way of words of example rather than words of limitation, and their use does not preclude inclusion of such modifications, variations and/or additions to the present invention as would be readily apparent to one of ordinary skill in the art, the scope of the present invention being set forth in the appended claims.

What is claimed is:

1. A multi-runway airfield hazard automated detection system comprising:

at least one radar scans an area for obstacles;

at least one radar imaging control system operatively connected to said radar, wherein said radar imaging control system compares said obstacles to known potential hazards and indicates a result;

at least one directed imaging system wherein said directed imaging system scans potential hazards and indicates a result; and at least one targeting control system operatively connected to said radar imaging control system and said directed imaging system, wherein said targeting control system directs said directed imaging system to scan said potential hazards indicated by said radar imaging control system.

2. A multi-runway airfield hazard automated detection system according to claim 1, wherein said multi-runway airfield hazard automated detection system further comprises a master control system which compares said potential hazard scan to airfield hazards and indicates the result.

3. A multi-runway airfield hazard automated detection system according to claim 1, wherein said radar imaging control system is an automated target recognition system.

4. A multi-runway airfield hazard automated detection system according to claim 2, wherein said radar imaging control system, targeting control system, and master control system are personal computers.

5. A multi-runway airfield hazard automated detection system according to claim 2, wherein said radar imaging control system, targeting control system, and master control system are one personal computer.

6. A method of detecting airfield hazards, comprising:

scanning the airfield with a radar;

comparing the results of the radar scan to known hazardous radar signatures;

indicating the results to a directed verification system;

verifying the results with directed imaging system; and signaling the results.

* * * * *